US009280806B2

(12) United States Patent
Shin et al.

(10) Patent No.: US 9,280,806 B2
(45) Date of Patent: Mar. 8, 2016

(54) EDGE SMOOTHING BLOCK FILTERING AND BLENDING

(71) Applicant: Broadcom Corporation, Irvine, CA (US)

(72) Inventors: Jaewon Shin, Mountain View, CA (US); Brian Schoner, Fremont, CA (US)

(73) Assignee: BROADCOM CORPORATION, Irvine, CA (US)

( * ) Notice: Subject to any disclaimer, the term of this patent is extended or adjusted under 35 U.S.C. 154(b) by 123 days.

(21) Appl. No.: 13/761,268

(22) Filed: Feb. 7, 2013

(65) Prior Publication Data

US 2014/0193094 A1     Jul. 10, 2014

Related U.S. Application Data

(60) Provisional application No. 61/750,933, filed on Jan. 10, 2013.

(51) Int. Cl.
*G06T 5/00* (2006.01)
*G06T 5/20* (2006.01)

(52) U.S. Cl.
CPC .. *G06T 5/002* (2013.01); *G06T 5/20* (2013.01)

(58) Field of Classification Search
CPC .. G06T 5/002; G06T 5/20; G06T 2207/20192
USPC .......... 382/199, 275, 264; 348/452, 441, 694, 348/43; 375/240.16, 240.13
See application file for complete search history.

(56) References Cited

U.S. PATENT DOCUMENTS

| 5,588,435 | A  | * | 12/1996 | Weng et al. | .................. 600/443 |
| 5,832,115 | A  | * | 11/1998 | Rosenberg | .................... 382/199 |
| 7,944,503 | B1 | * | 5/2011 | Zhai | ...................... H04N 7/012 |
| | | | | | 348/452 |
| 8,023,766 | B1 | * | 9/2011 | Bergman | ................. G06K 9/34 |
| | | | | | 358/3.26 |
| 2006/0013501 | A1 | * | 1/2006 | Tamura | ..................... G06T 5/20 |
| | | | | | 382/260 |
| 2007/0140347 | A1 | * | 6/2007 | Moon et al. | .............. 375/240.16 |
| 2008/0247462 | A1 | * | 10/2008 | Demos | ..................... 375/240.03 |
| 2010/0259650 | A1 | * | 10/2010 | Sasaki | ........................... 348/241 |
| 2010/0328427 | A1 | * | 12/2010 | Sakano et al. | ................... 348/43 |
| 2011/0134315 | A1 | * | 6/2011 | Levy et al. | ..................... 348/441 |
| 2011/0249909 | A1 | * | 10/2011 | Lee et al. | ...................... 382/264 |
| 2011/0255004 | A1 | * | 10/2011 | Tran et al. | ..................... 348/699 |
| 2014/0369600 | A1 | * | 12/2014 | Fu | ............................. G06T 5/20 |
| | | | | | 382/165 |

* cited by examiner

*Primary Examiner* — Mekonen Bekele
(74) *Attorney, Agent, or Firm* — Foley & Lardner LLP

(57) ABSTRACT

Aspects of an edge smoothing block filter and combinations of the filter with a motion compensated temporal filter are described. In one embodiment, edge smoothing block filtering includes selecting a current pixel to be filtered and selecting a candidate pixel within a search area about the current pixel. The edge smoothing block filtering generally seeks to identify candidate pixels having surrounding pixels similar to pixels surrounding the current pixel. The edge smoothing block filtering further computes a cost difference between pixels within a candidate pixel neighborhood and pixels within a current pixel neighborhood, and filters the current pixel based on the cost difference. Aspects of the filters and filter element combinations may preserve edges and textures adaptively based on image content. For example, diagonal or curved image edges may be filtered along edges while texture is preserved along the edges.

15 Claims, 15 Drawing Sheets

EDGE SMOOTHING BLOCK FILTERING AND BLENDING

CROSS-REFERENCE TO RELATED APPLICATIONS

This application claims the benefit of and priority to U.S. Provisional Application No. 61/750,933, filed Jan. 10, 2013, the entire contents of which is hereby incorporated herein by reference.

BACKGROUND

The concepts of digital image processing include various algorithms, among others, for filtering, distortion, and noise reduction. Generally, pixel values, pixel positions, and relative pixel values and positions may be relied upon by processing algorithms for digital images. In various aspects, the algorithms rely upon linear and non-linear functions and, in some cases, motion of pixels among respective frames in videos. Additionally, while one algorithm may be developed and applied to address a particular problem in the field of image processing, various algorithms may be combined in certain aspects to achieve more advanced filtering.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
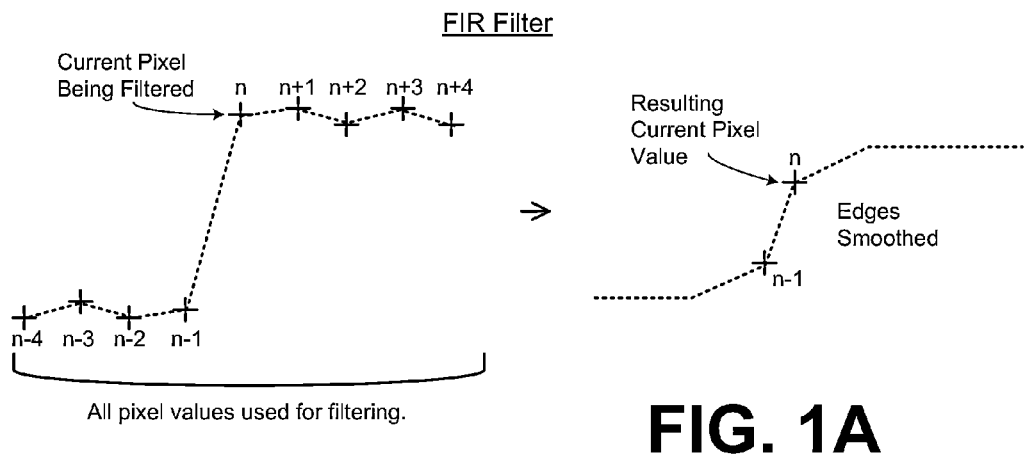
FIGS. 1A and 1B illustrate example values of a current pixel, filtered by finite impulse response and bilateral filters, according to certain aspects of embodiments described herein.

The concepts of digital image processing include various algorithms, among others, for filtering, distortion, and noise reduction. Generally, pixel values, pixel positions, and relative pixel values and positions may be relied upon by processing algorithms for digital images. In various aspects, the algorithms rely upon linear and non-linear functions and, in some cases, motion of pixels among respective frames in videos. Additionally, while one algorithm may be developed and applied to address a particular problem in the field of image processing, various algorithms may be combined in certain aspects to achieve more advanced filtering.

In this context, various aspects of an Edge Smoothing Block (ESB) filter and filtering algorithm and combinations of the ESB filter with a Motion Compensated Temporal Filtering (MCTF) filter or filtering algorithm are described herein. The ESB and MCTF filters, filtering algorithms, and aspects of their combination described herein, are designed to handle a mix of digital and temporal noise. For example, when used together with MCTF filtering, ESB filtering addresses slowly moving digital noise, while temporal noise is addressed by MCTF filtering. Additionally, aspects of the ESB and MCTF filtering described herein preserve edges and textures adaptively based on image content. For example, diagonal or curved image edges may be filtered along edges while texture is preserved along the edges.

Generally, denoising refers to image filtering techniques which suppress noise or artifacts while preserving original image features, especially edges, lines, and textures, for example. Spatial-denoising relies on spatial information, such as local pixel values and statistics, for filtering. A spatial-denoising operation can be written as follows:

$$\hat{l}(x_0, y_0) = f_{x,y \in S}(l(x,y)). \quad (1)$$

In the expression (1) above, $\hat{l}(x_0, y_0)$ is a resulting filtered pixel value, $l(x, y)$ is a current pixel being filtered, and $f(\bullet)$ is a filter function. The filter function $f(\bullet)$ can be non-linear or linear, for example. For many image and video processing applications, however, a linear filter operation is preferred for simplicity. In certain cases, a non-linear filter operation can produce unpredictable artifacts. In contrast, artifacts from a linear filter operation may be more predictable and controllable.

A spatial-denoising operation incorporating a linear filter function can be written as follows:

$$\hat{l}(x_0, y_0) = \Sigma_{x,y \in S} w(x,y) \cdot l(x,y). \quad (2)$$

In the expression (2) above, $\hat{l}(x_0, y_0)$ is a resulting filtered pixel value of the current pixel value (i.e., $l(x_0, y_0)$) being filtered at position $(x_0, y_0)$, $l(x, y)$ is a pixel value of a candidate pixel in a search area S at position $(x, y)$, and $w(x, y)$ is a weight function $w(\bullet)$ for a pixel value at position $(x, y)$ in the search area S about the current pixel $l(x, y)$. Thus, in the expression (2), the resulting filtered pixel value $\hat{l}(x_0, y_0)$ comprises a weighted sum of the pixel values in the search area S, where each pixel value in the search area S is weighted by a coefficient determined by the weight function $w(\bullet)$.

In various examples of linear filter functions, the weight function $w(\bullet)$ may equally weight each pixel in a search area S. In an example Finite Impulse Response (FIR) linear filter, over a 3×3 search area, $w(\bullet)$ may comprise a rect filter $$\begin{bmatrix} 1 & 1 & 1 \\ 1 & 1 & 1 \\ 1 & 1 & 1 \end{bmatrix} \cdot \frac{1}{9}.$$

FIG. 1A illustrates an example current pixel filtered by a finite impulse response filter according to certain aspects of embodiments described herein. As illustrated in FIG. 1A, all pixel values within a search area are used for filtering, and contrast in pixel values between pixels is "smoothed" among the pixels in the search area, regardless of the relative positions and pixel values among the pixels in the search area. For example, in the case of the rect filter described above, a resultant current pixel value is determined based on an equal weighting of surrounding pixels, regardless of the relative positions and pixel values of the surrounding pixels. Thus, in FIG. 1A, the difference in pixel values between pixels n and n−1 is lost or "smoothed," which may lead to the loss of image contrast or a blurry image edge.

In another FIR filter example, the weight function $w(\bullet)$ may weight each pixel according to a position $(x, y)$ of a neighboring candidate pixel relative to a position $(x_0, y_0)$ of the current pixel being filtered. For example, $w(\bullet)$ may be defined as follows:

$$w(x, y) = \alpha \cdot \exp\left(-\frac{(x - x_0)^2 + (y - y_0)^2}{\sigma^2}\right). \quad (3)$$

In the expression (3) above, $\alpha$ is a normalizing constant and $\sigma^2$ is noise variance. It is noted, generally, that an FIR filter may be a poor choice for spatial-denoising, unless an image is purely band-limited and the noise or artifacts to be filtered are outside a signal band. Thus, some FIR filters rely upon local statistics for spatial-denoising to identify the noise or artifacts outside the signal band.

In bilateral filter examples, the weight function $w(\bullet)$ depends not only on the position of a neighboring candidate pixel, but also upon pixel (e.g., intensity) values of neighboring candidate pixel(s). Here, it is considered that, if a neighboring pixel value is too different from the current pixel being filtered, that pixel value is ignored. In this manner, sharp edges may be preserved. For example, a weight function $w(\bullet)$ of a bilateral spatial-denoising filter can be written as follows:

$$w(x, y) = \alpha \cdot \exp\left(-\frac{(x - x_0)^2 + (y + y_0)^2}{\sigma^2}\right) \cdot \exp\left(-\frac{(l(x_0, y_0) - l(x, y))^2}{\sigma_I^2}\right). \quad (4)$$

In the expression (4) above, $\sigma^2$ is a noise variance of the image, and $\sigma_I^2$ is a a noise variance of the candidate pixel at position $(x, y)$.

Figure 1B:
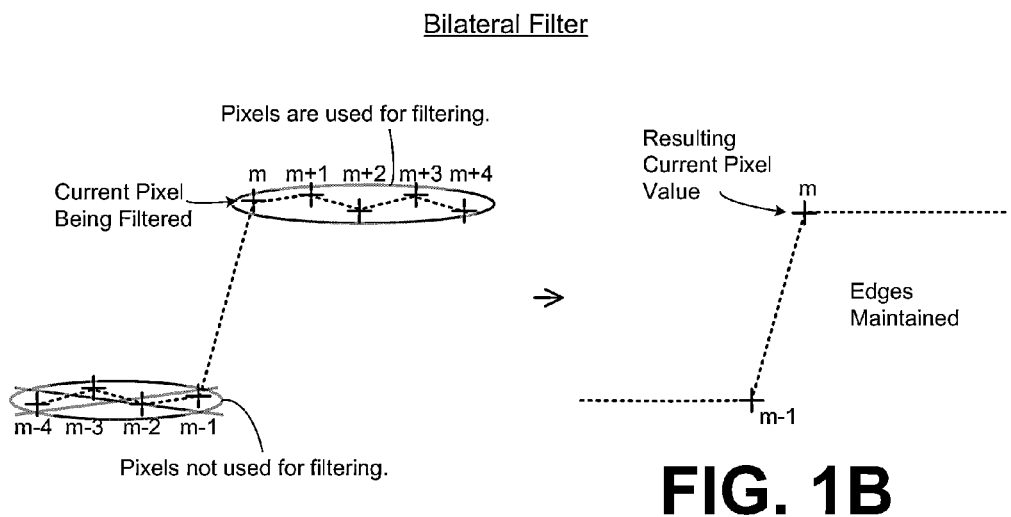

FIG. 1B illustrates an example current pixel filtered by a bilateral filter according to certain aspects of embodiments described herein. As illustrated in FIG. 1B, only pixel values having at least a threshold "similarity" value to the current pixel are used for filtering. Thus, in FIG. 1B, the pixel values of pixels m to m+4 are used to filter the value of pixel m, while the pixel values of pixels m−4 to m−1 are not used. Thus, the difference between pixels m and m−1 is more closely maintained as compared to the FIR filter of FIG. 1A. Thus, image contrast and edges are better retained and defined.

In another example according to certain aspects of the embodiments described herein, the bilateral filter concept is extended to include a local neighborhood of candidate pixels, in a Non Local Mean (NLM) filter. As one example, a weight function $w(\bullet)$ of a NLM spatial-denoising filter can be written as follows:

$$w(x, y) = \alpha \cdot \exp\left(-\frac{(x - x_0)^2 + (y - y_0)^2}{\sigma^2}\right) \cdot \exp\left(-\frac{SAD(x_0, y_0, x, y)^2}{\sigma_I^2}\right). \quad (5)$$

In the expression (5) above, $SAD(x_0, y_0, x, y)$ is a sum of absolute difference between neighborhoods of pixels around the candidate pixel at position $(x, y)$ and the current pixel being filtered at position $(x_0, y_0)$. In some aspects, an NLM filter preserves edges better than a bilateral filter by filtering along edges or lines. Again, because knowledge of noise variance, as relied upon by NLM and bilateral filters, is generally unavailable and difficult to estimate correctly, low-level textures are often lost by NLM and bilateral filters. As discussed in further detail below, embodiments of ESB filters described herein comprise an extension of certain aspects of NLM spatial-denoising filters.

Figure 2:
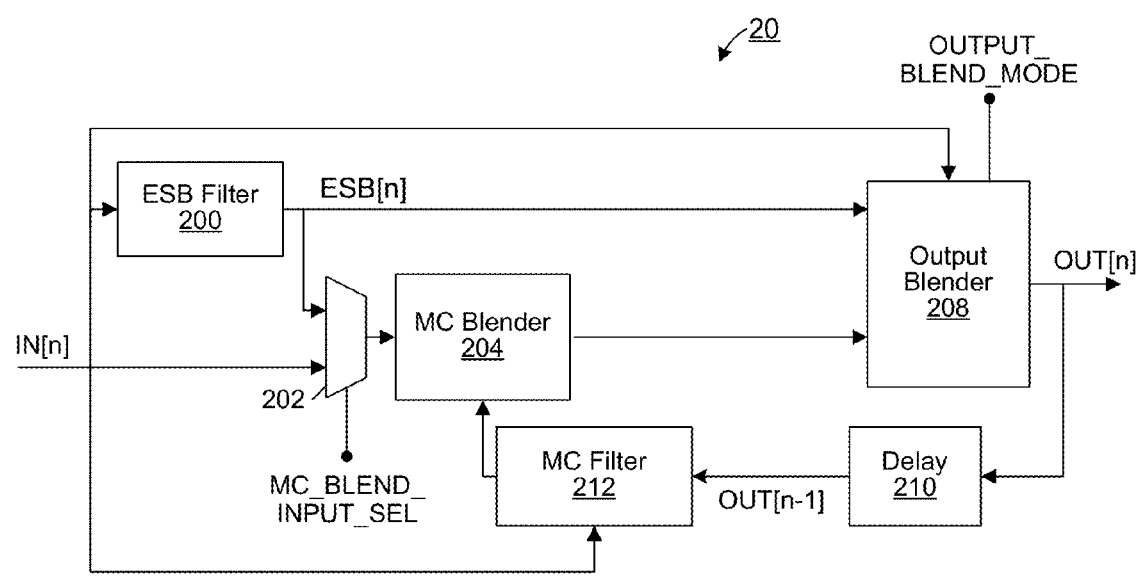
FIG. 2 illustrates an example combination of an edge smoothing block filter among motion compensation temporal filter elements according to various embodiments described herein.

FIG. 2 illustrates an example combination of an ESB filter 200 among MCTF filter elements according to various embodiments described herein. FIG. 2 illustrates a filter 20 comprising an ESB filter 200, a multiplexer 202, an MC blender 204, an output blender 208, a delay 210, and an MC filter 212. Input pixels, IN[n], are provided as an input to the filter 20, and the filter 20 generates output pixels OUT[n]. The filter 20 combines the ESB filter 200 with an MCTF filter. In other words, the filter 20 combines the ESB filter 200 with aspects of a temporal filter. As described herein, a temporal filter filters pixels across a sequence images, for example, in a video comprising a plurality of images.

Aspects of the ESB filter 200 are described in further detail below with reference to FIG. 3. Based on an MC_BLEND_INPUT_SEL signal, the multiplexer 202 feeds either the output ESN[n] of the ESB filter 200 or the input IN[n] to the MC blender 204. The MC blender 204 combines or blends the output of the multiplexer 202 and the output of the MC filter 212, to provide an MC blender output signal. The output of the MC blender 204 is provided as an input to the output blender 208. An output of the output blender 208 is provided as feedback to the MC filter 212, after being delayed by the delay 210. It is noted that the loop among the MC filter 212, the MC blender 204, the output blender 208, and the delay 210 comprises a temporal filter that filters pixels over time, due in part to the time delay provided by the delay 210.

The output blender 208 also receives the ESB[n] output of the ESB filter 200 and the input signal IN[n] as inputs. The output blender 208 blends at least one of the input signal IN[n], the ESB[n] output of the ESB filter 200, and the output of the MC blender 204 based on the OUTPUT_BLEND_MODE signal. Thus, beyond the MC_BLEND_INPUT_SEL multiplexer control signal, the OUTPUT_BLEND_MODE signal defines certain configurations of the filter 20. Various operational aspects of the filter 20 according to the MC_BLEND_INPUT_SEL and OUTPUT_BLEND_MODE signals are described below with reference to FIGS. 10-12.

Figure 3:
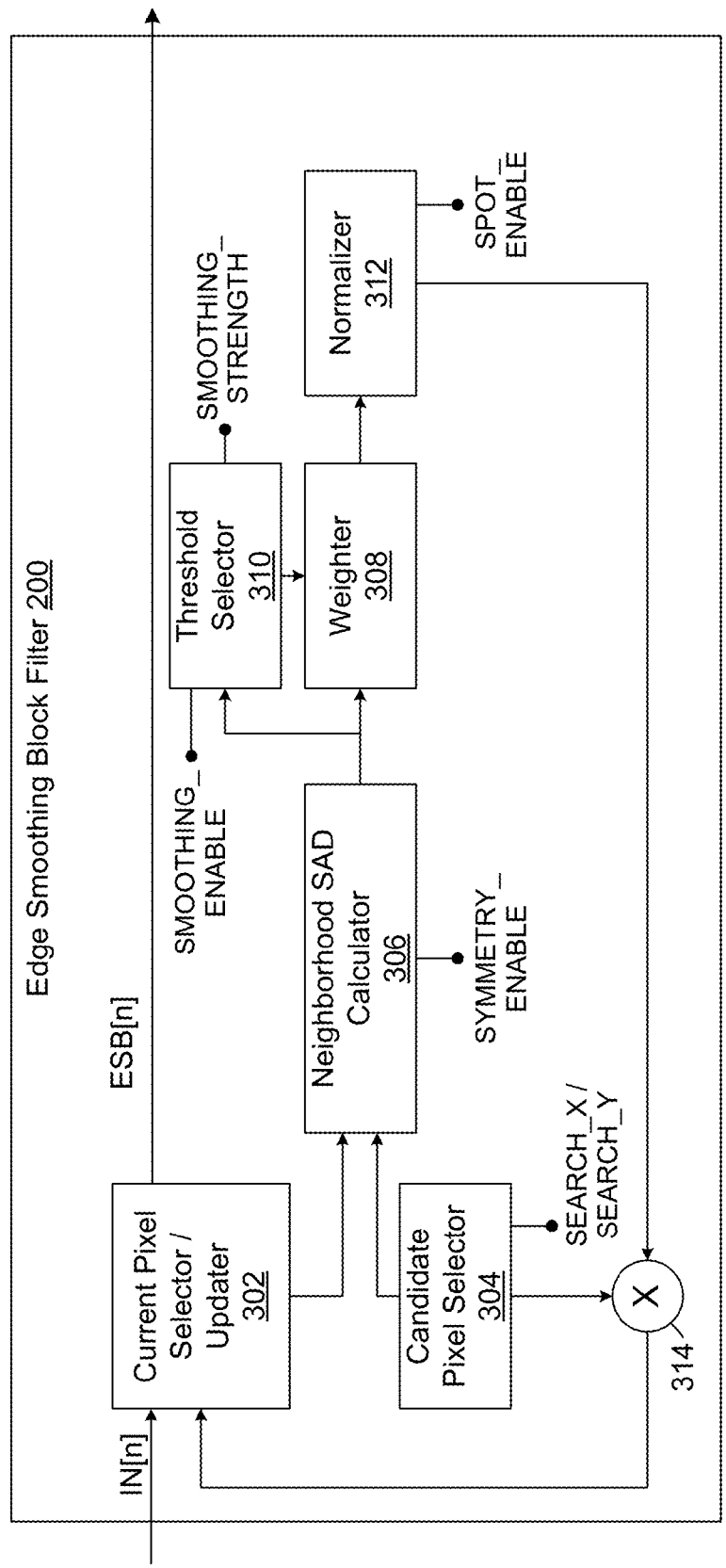
FIG. 3 illustrates example edge smoothing block filter elements of the edge smoothing block filter of FIG. 2 according to various embodiments described herein.

FIG. 3 illustrates example edge smoothing block filter elements of the ESB filter 200 of FIG. 2 according to various embodiments described herein. The ESB filter 200 comprises a current pixel selector and updater 302, a candidate pixel selector 304, a neighborhood SAD calculator 306, a weighter 308, a threshold selector 310, a normalizer 312, and a multiplier 314. During operation of the ESB filter 200, generally, the current pixel selector 302 selects a current pixel as a pixel to be filtered, and the candidate pixel selector 304 selects a candidate pixel within a search area about the current pixel. The neighborhood SAD calculator 306 computes a cost difference between pixels within a candidate pixel neighborhood about the candidate pixel and pixels within a current pixel neighborhood about the current pixel. The weighter 308 converts the cost difference to a similarity measure based on a weight function, the weight function being selected based on the SMOOTHING_STRENGTH input. The normalizer 312 normalizes the similarity measure, and the multiplier 314 filters the current pixel based on the candidate pixel and the normalized similarity measure. Further aspects and features of the ESB 200 and the individual elements thereof are described in additional detail below with reference to FIGS. 4-7 below.

Figure 4:
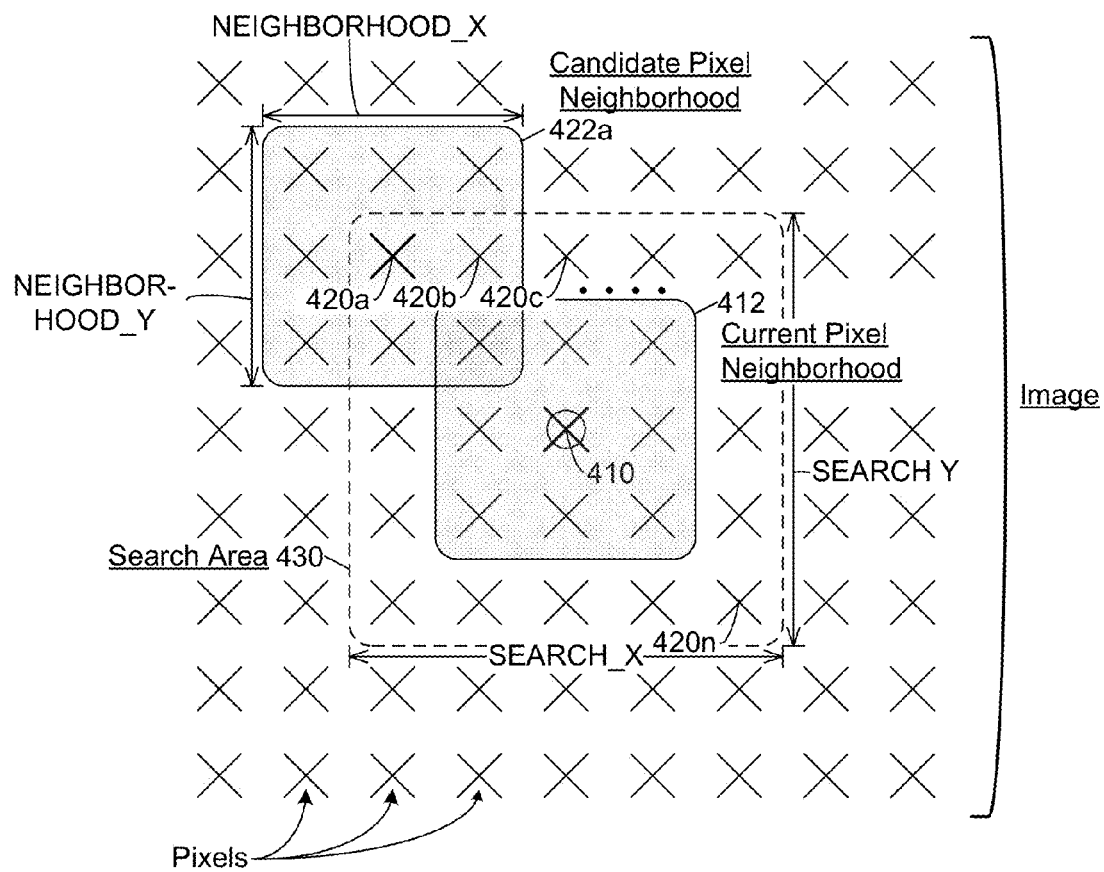
FIG. 4 illustrates example search, current pixel neighborhood, and candidate pixel neighborhood areas relied upon by the edge smoothing block filter of FIG. 3 according to certain aspects of the embodiments described herein.

FIG. 4 illustrates example search 430, current pixel neighborhood 412, and candidate pixel neighborhood 422a areas relied upon by the ESB filter 200 of FIG. 3 according to certain aspects of the embodiments described herein. FIG. 4 illustrates certain pixels (designated by x's) of an image, including a current pixel 410 and a candidate pixel 420a, among others. The candidate pixel neighborhood 422a is illustrated about the candidate pixel 420a. The candidate pixel neighborhood 422a is defined by the NEIGHBOORHOOD_X and NEIGHBOORHOOD_Y parameters to be a certain number of pixels wide and tall. Similarly, the current pixel neighborhood 412 is illustrated about the current pixel 410. A search area 430 is illustrated about the current pixel 410, and is defined by the SEARCH_X and SEARCH_Y parameters to be a certain number of pixels wide and tall.

As illustrated, several pixels beside the candidate pixel 420a exist within the search area 430, including the pixels 420b to 420n. In general, the candidate pixel selector 304 may select each of the pixels 420a to 420n within the search area 430, in certain aspects of operation of the ESB 200 described herein. Further, a candidate pixel neighborhood may be defined by the ESB 200 for each of the candidate pixels 420a to 420n. As described in further detail below, according to the operation of the ESB 200, respective pixel values of the candidate pixel neighborhood 422a are compared to corresponding pixel values of the current pixel neighborhood 412. This operation may be performed for each of the candidate pixels 420a to 420n. It is noted that the size of the candidate and current pixel neighborhoods 422a and 412 and the search area 430, as illustrated in FIG. 4, are defined by the NEIGHBORHOOD_X, NEIGHBORHOOD_Y, SEARCH_X, and SEARCH_Y parameters to be 3 pixels, 3 pixels, 5 pixels, and 5 pixels. However, other sizes are within the scope and spirit of the embodiments described herein.

Figure 5:
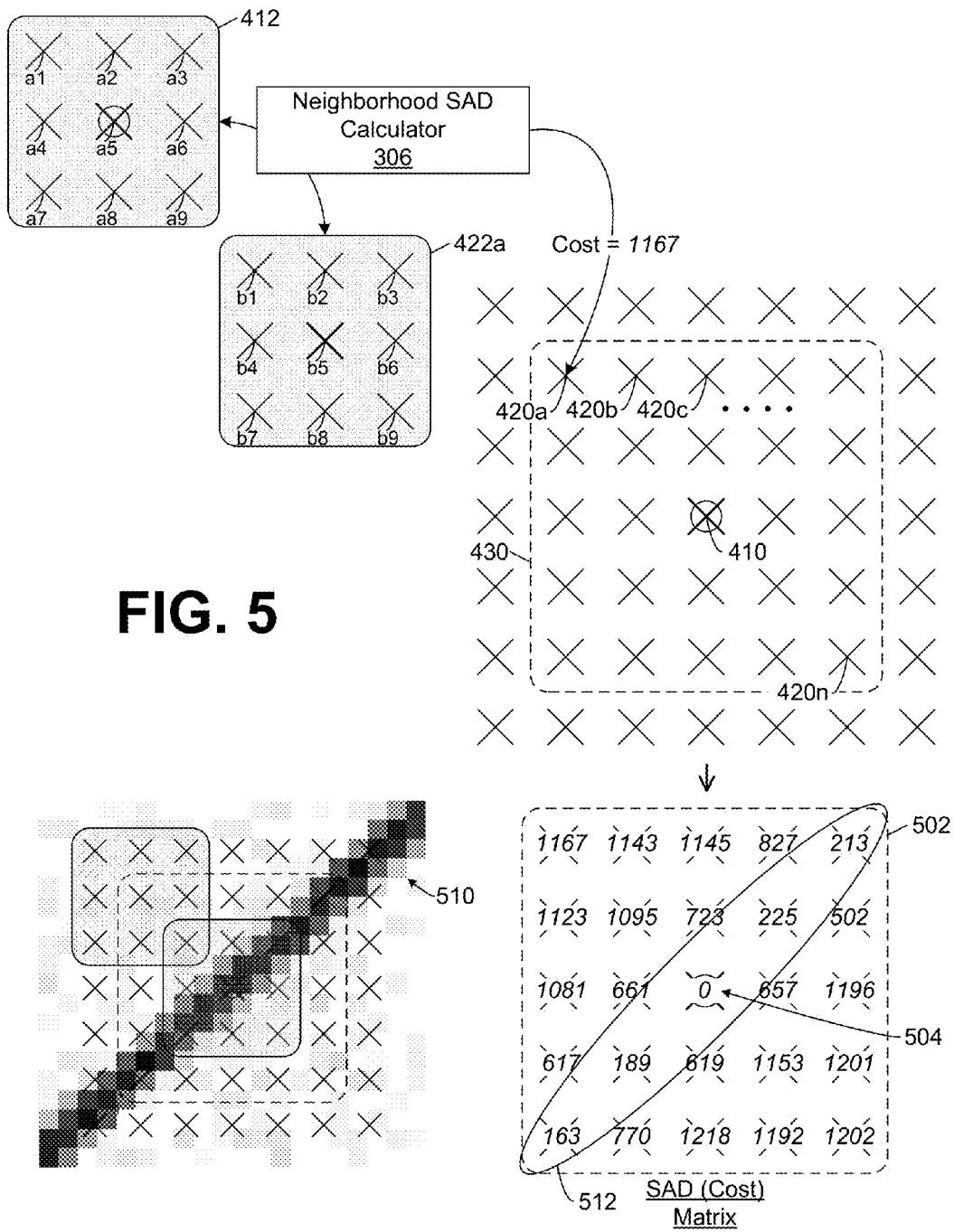
FIG. 5 illustrates an example difference or cost calculation performed by a neighborhood calculator in the edge smoothing block filter of FIG. 3 according to certain aspects of the embodiments described herein.

With reference to the definition of terms described above in FIG. 4, FIG. 5 illustrates an example difference or cost calculation performed by the neighborhood calculator 306 in the ESB filter 200 of FIG. 3 according to certain aspects of the embodiments described herein. In FIG. 5, the neighborhood SAD calculator 306 performs a sum of absolute difference (SAD) calculation between pixels of corresponding positions in the current pixel neighborhood 412 and the candidate pixel neighborhood 422a, over pixels comprising the image 510.

For example, the neighborhood SAD calculator 306 sums the absolute difference between the a1 and b1 pixel luma values, the absolute difference between the a2 and b2 pixel luma values, the absolute difference between the a3 and b3 pixel luma values, and so forth, for each pixel within the neighborhoods 412 and 422a of the pixels 410 and 420a. Each SAD comprises a luma cost difference between the current pixel 410 and the candidate pixel 420a. As illustrated in FIG. 5, the cost difference between the current pixel 410 and the candidate pixel 420 is 1167. In other embodiments, it is noted that the neighborhood SAD calculator 306 may calculate cost differences using metrics other than the SAD metric. Additionally or alternatively to using pixel luma values, pixel chroma values may be relied upon in cost difference calculations by the neighborhood SAD calculator 306. If relying upon alternative color space models, red, green, blue or other pixel color-space, contrast, brightness, etc. pixel values may be relied upon in cost difference calculations by the neighborhood SAD calculator 306.

The neighborhood SAD calculator 306, in certain aspects, performs this sum of absolute difference calculation for each candidate pixel (e.g., 420a to 420n) within the search area 430 about the current pixel 410, in connection with the selection of each candidate pixels by the candidate pixel selector 304. In other words, the neighborhood SAD calculator 306 generates a cost difference between each candidate pixel 420a to 420n selected by the candidate pixel selector 304 and the current pixel 410.

Matrix 502 illustrates an example matrix of cost differences calculated by the neighborhood SAD calculator 306. Here, it is noted that the cost difference for the center 504 of the matrix 502 is zero, because the candidate pixel selected by the candidate pixel selector 304 is the current pixel for the center 504 (i.e., the current and candidate pixels and pixel neighborhoods are the same at the center 504). In the matrix 502, the region of 512 generally includes lower cost differences per pixel over the image 510. That is, in the region 512 generally follows the edge or line in the image 510. Thus, it is noted that costs along similar lines, edges, and patterns of pixel neighborhoods approach zero, and costs along dissimilar lines, edges, and patterns are relatively larger.

Figure 6:
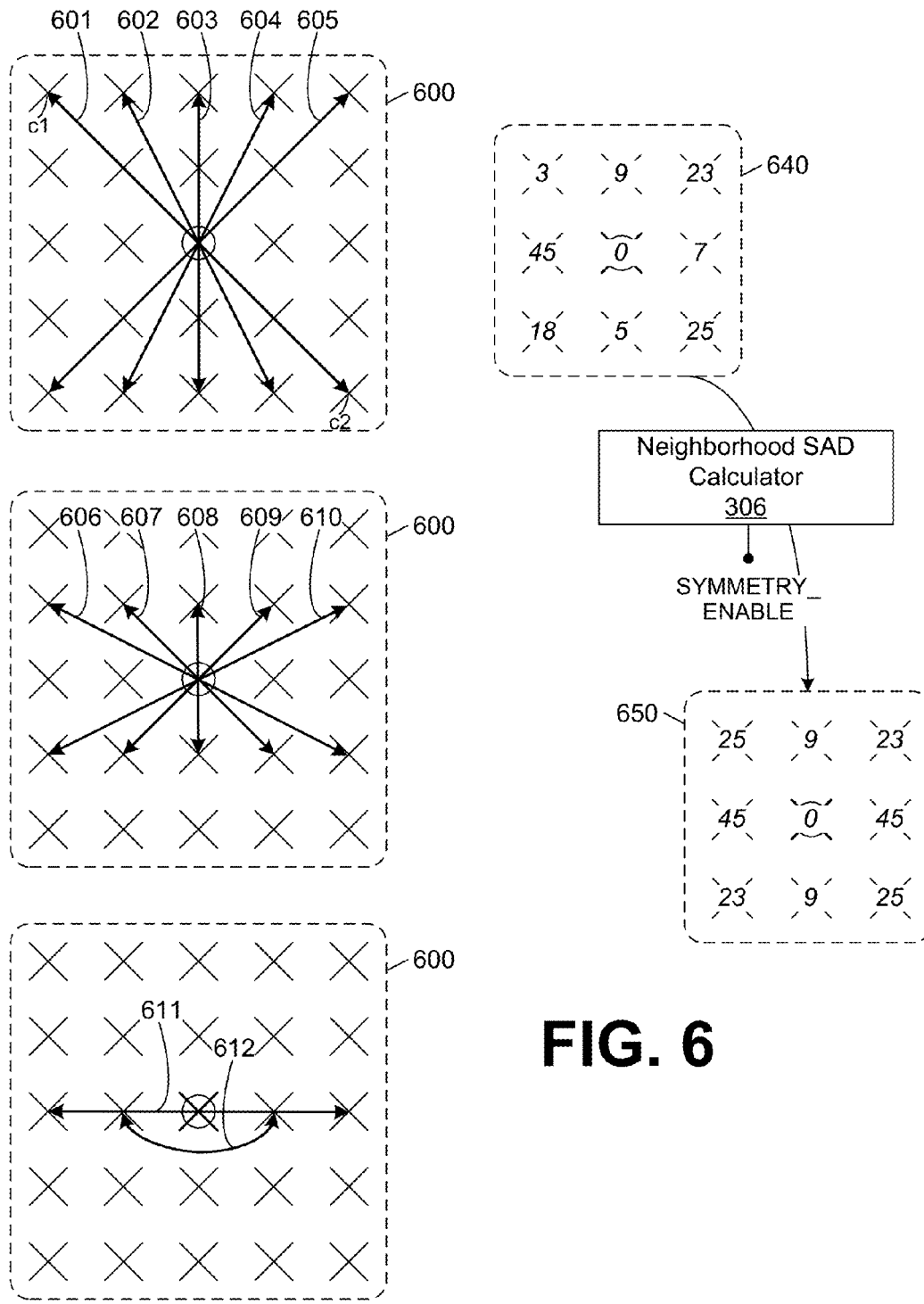
FIG. 6 illustrates an example symmetry calculation performed by the neighborhood calculator in the edge smoothing block filter of FIG. 3 according to certain aspects of the embodiments described herein.

In another aspect of the neighborhood SAD calculator 306, FIG. 6 illustrates an example symmetry calculation performed by the neighborhood SAD calculator 306 in the ESB filter 200 of FIG. 3 according to certain aspects of the embodiments described herein. Particularly, the neighborhood SAD calculator 306 may make the matrix 502 "symmetric" to emphasize directionality in costs within the matrix 502, in response to the SYMMETRY_ENABLE signal. In the case of enabling symmetry by the SYMMETRY_ENABLE signal, the neighborhood SAD calculator 306 emphasizes small cost differences that are directionally aligned. For a 5×5 search area, twelve SAD pair values 601-612 are compared, and the neighborhood SAD calculator 306 replaces both values with the maximum cost among them. For example, for the SAD pair 601, the neighborhood SAD calculator 306 determines the maximum cost among costs c1 and c2 (e.g., MAX(c1, c2)), and replaces the values of each c1 and c2 with the maximum cost. According to this symmetry calculation, the cost matrix 640 in FIG. 6 would be replaced by the cost matrix 650. While FIG. 6 illustrates the example pair values 601-612, other directional pair values are within the scope and spirit of the embodiments described herein, without limitation.

FIG. 7 illustrates an example weight function similarity calculation and an example normalization calculation performed by the weighter 308 and the normalizer 312, respectively, in the ESB filter 200 of FIG. 3 according to certain aspects of the embodiments described herein. As illustrated in FIG. 7, the weighter 308 generates a similarity measure matrix 702 based on a weight curve. In this process, costs larger than a certain threshold are ignored (i.e., zero-value similarity measures are returned). It is noted that performance of denoising by the ESB filter 200 depends, at least in part, on the shape (or strength) of the weight curve and the selection the noise threshold of the curve. Given the same noise threshold, the shape of the weight curve determines how aggressively filtering is performed. In the example weight curves illustrated in FIG. 7, the curve 710 represents an aggressive filter curve, the curve 712 represents a medium filter curve, and the curve 714 represents a conservative filter curve. It is noted that the curve shapes illustrated in FIG. 7 are provided by way of example only and other shapes (or strengths) are within the scope and spirit of the environments described herein.

It is noted that each curve 710, 712, and 714 includes a noise threshold. Any cost difference greater than this threshold will return a zero-value similarity measure. In one embodiment, the curve and threshold used by the weighter 308 is implemented according to the MAX(SAD_thr−SAD cost value, 0) function. In other words, for each SAD cost value in the cost matrix 502, a respective similarity measure may be calculated by subtracting the SAD cost value from an SAD_thr threshold. If the SAD cost value is greater than the SAD_thr threshold (and a negative value is returned), the MAX(SAD_thr−SAD, 0) function returns a zero value. As illustrated in FIG. 7, any SAD cost values in the cost matrix 502 greater than 609 are returned as a zero similarity measure in the similarity measure matrix 702 by the weighter 308.

Among embodiments, threshold-based filtering according to a fixed noise threshold may be used for an entire image of pixels based on a 'noise_sigma' register of the ESB filter 200, or a variable threshold may be used. In some embodiments, a certain noise threshold is used for each pixel in the image based on a 'local_noise_sigma' register of the ESB filter 200. The 'local_noise_sigma' register may be determined from a nominal value of the 'noise_sigma' register in combination with other local pixel value statistics, for example.

In other embodiments, for reasons discussed below with reference to FIGS. 8A-8C, 9A, and 9B, the noise threshold may be determined based on a function of a maximum SAD cost in the cost matrix 502 in combination with a fixed threshold determined based on the 'noise_sigma' register. For example, SAD_thr may be set by the threshold selector 310 as a fixed fraction of the maximum SAD cost in the cost matrix 502, SAD_max.

Figure 8A:
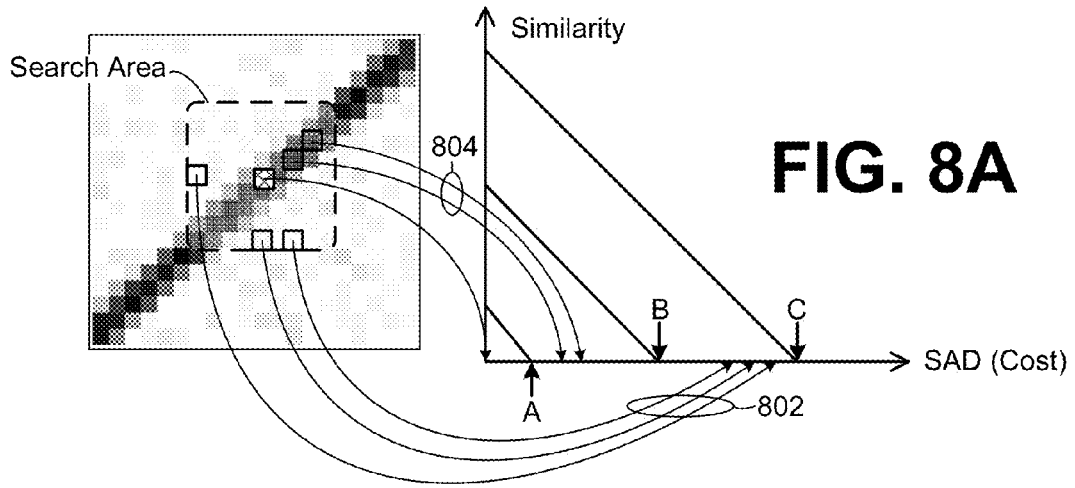
FIGS. 8A-8C illustrate example images and corresponding weight curve threshold selections made by the threshold selector in the edge smoothing block filter of FIG. 3 according to certain aspects of the embodiments described herein.
Figure 8B:
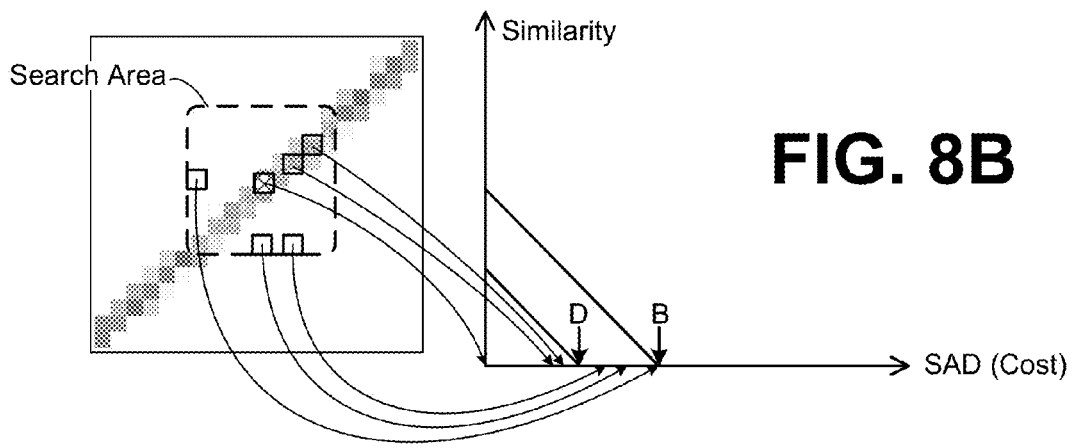
Figure 8C:
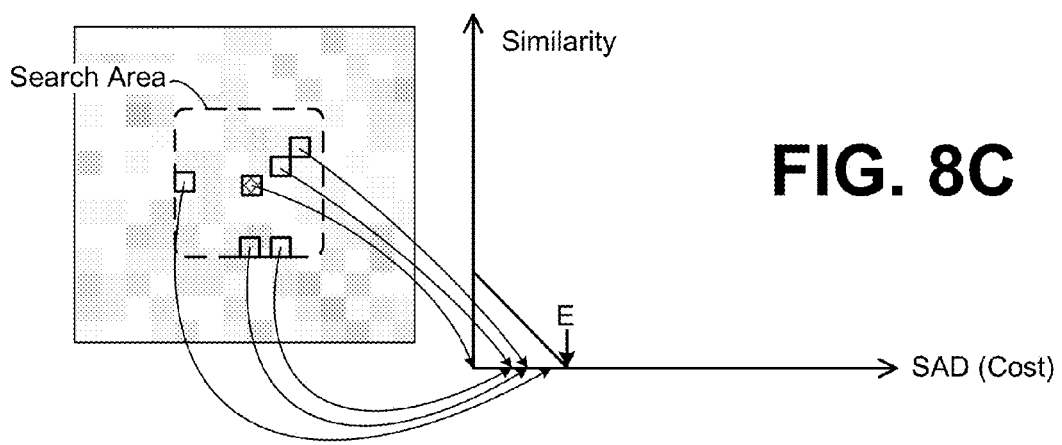

FIGS. 8A-8C illustrate example images and corresponding weight curve threshold selections made by the threshold selector 310 in the ESB filter 200 of FIG. 3 according to certain aspects of the embodiments described herein. As illustrated in FIG. 8A, the SAD costs 802 are relatively large and attributed to noise in an image comprising a line. To prevent any filtering of a current pixel in the image based on such noise, the threshold selector 310 must select a threshold for the weighter 308 that returns zero-value similarity measures for the SAD costs 802.

In FIG. 8A, the threshold "A" is substantially too low and will prevent any filtering of a current pixel according to the SAD costs 804, which are associated with pixel neighborhoods similar to the neighborhood of the current pixel. The threshold "B" is preferable so that noise may filtered by the ESB 200 along the line. The threshold "C" is substantially too high and will blur the line.

In FIG. 8B, the image comprises a line of lower contrast. In this case, the threshold "B" is substantially too high and will blur the line. The threshold "D" is preferable so that noise may filtered by the ESB 200 along the line. In FIG. 8C, the image comprises noise. In this case, the relatively low threshold "E" may be an appropriate selection, because the image contains no edges.

Thus, for the reasons discussed above, a good threshold choice is critical in ESB filtering performance. If the threshold is chosen too aggressive, a considerable amount of low-level signals or textures may be filtered away. If the threshold is chosen too conservative, on the other hand, then 'filtering-along-edges/lines' will not be achieved. According to aspects of the embodiments discussed herein, cost threshold is adapted to local signal contrast strength. This achieves aggressive filtering along strong edges, while preserving the fine or weaker edges by proportionate filtering.

Figure 9A:
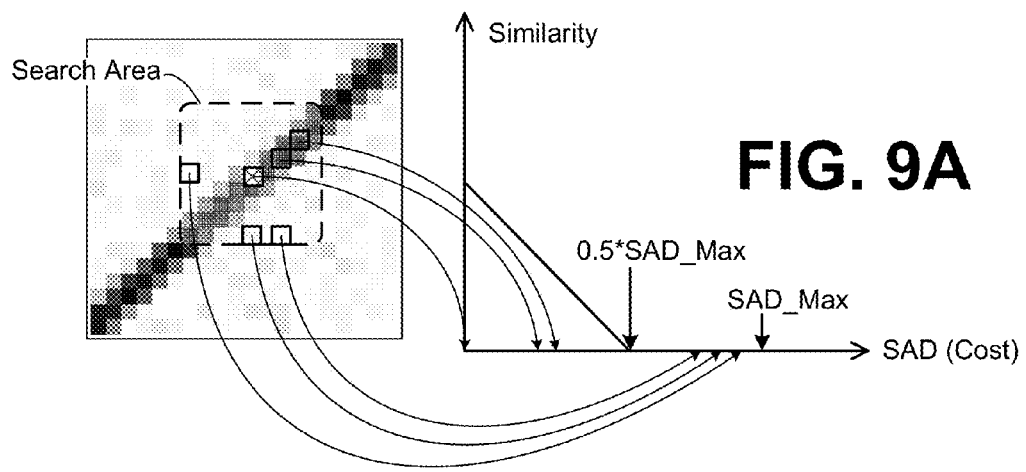
FIGS. 9A-9B illustrate example images and corresponding weight function threshold selections performed by the threshold selector in the edge smoothing block filter of FIG. 3 according to certain aspects of the embodiments described herein.
Figure 9B:
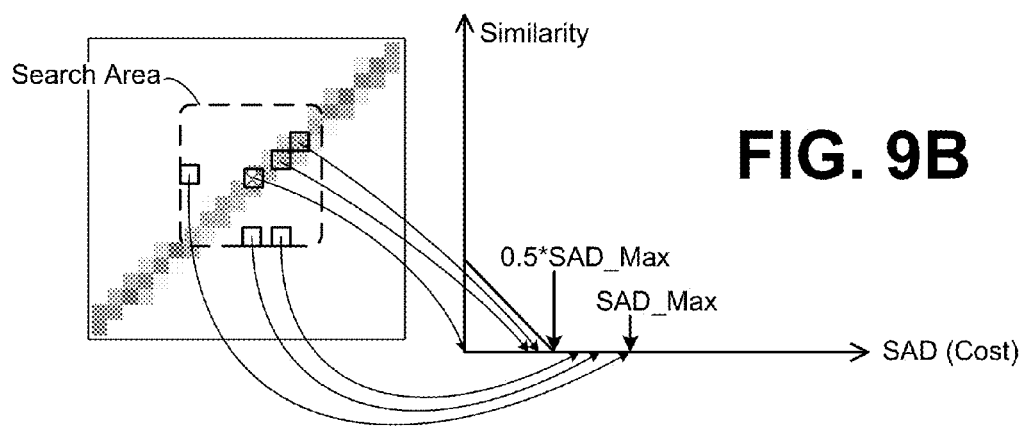

FIGS. 9A-9B illustrate example images and corresponding weight function threshold selections performed by the threshold selector 310 in the ESB filter 200 of FIG. 3 according to certain aspects of the embodiments described herein. As illustrated in FIGS. 9A and 9B, for threshold adaptation to local signal contrast strength, the noise threshold may be determined based on a function of a maximum SAD cost in the cost matrix 502. For example, SAD_thr may be set by the threshold selector 310 as a fixed fraction of the maximum SAD cost, SAD_max, in the cost matrix 502. The fixed fraction may be determined to be 0.25 for weak smoothing, 0.5 for default smoothing, or 0.75 for strong smoothing, for example, based on the SMOOTHING_STRENGTH signal. This allows for more aggressive filtering along strong edges, while preserving fine or weaker edges by proportionate filtering. As described herein, this technique of threshold adaptation is called threshold smoothing. Threshold smoothing can aggressively filter digital noise, analog noise, and jaggedness along edges or lines while preserving fine or weaker edges.

It is noted that, in some cases, threshold smoothing may not be suited to filter noise in flat areas (e.g., the image of FIG. 8C), because most neighboring pixels will have SAD costs larger than, for example, 0.5*SAD_max in flat areas. To address this, the threshold selector 310 has an option of combining threshold smoothing and threshold-based filtering. In contrast to threshold smoothing, threshold-based filtering relies upon a fixed threshold, regardless of any SAD_max cost. As discussed above, for example, the fixed threshold may be selected based on the 'noise_sigma' or 'local_noise_sigma' registers of the ESB filter 200. In a hybrid of threshold smoothing and threshold-based filtering, the threshold selector 310 may select the SAD_thr threshold according to the function MAX(constant*fixed_threshold, 0.5*SAD_max). In this case, when 0.5*SAD_max is smaller than the fixed_threshold value, the fixed_threshold value is used instead of the 0.5*SAD_max value. Alternatively, when 0.5*SAD_max is greater than or equal to the fixed_threshold value, the 0.5*SAD_max value is used instead of the fixed_threshold value. In this manner, the ESB filter 200 better adjusts for and filters noise in relatively flat regions.

In one embodiment, according to the SMOOTHING_ENABLE signal fed into the threshold selector 310, the threshold selector 310 either (1) selects SAD_thr is purely based on a fixed_threshold value (i.e., smoothing is disabled), (2) selects hybrid smoothing as discussed above, or (3) selects pure smoothing (i.e., the fixed_threshold is disabled/ignored).

Referring back to FIG. 7A, the normalizer 312 normalizes each of the similarity measures of the similarity measure matrix 702, to arrive at a weight matrix 704. The weight matrix 704 comprises normalized values from the similarity measure matrix 702. As one example of normalization performed by the normalizer 312, each of the similarity measures in the similarity measure matrix 702 are summed, and each similarity measure is divided by the sum. In one embodiment, to ensure that the filter weight coefficients in the weight matrix 704 sum to 1, any remainder value may be added to the center tap. In other words, any remainder value may be added to the tap of the current pixel.

Figure 7A:
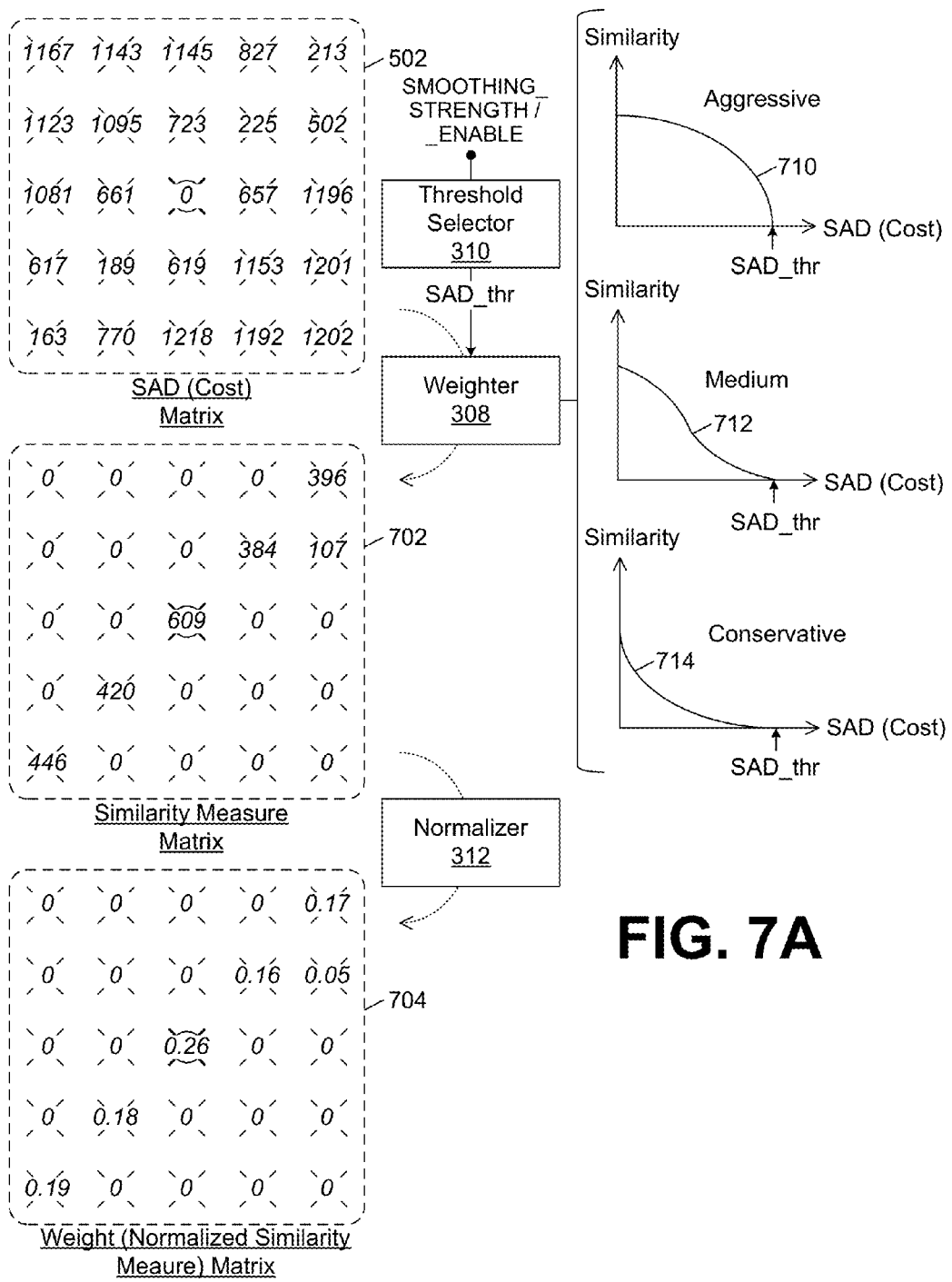
FIG. 7A illustrates an example weight function similarity calculation and an example normalization calculation performed by a weighter and a normalizer, respectively, in the edge smoothing block filter of FIG. 3 according to certain aspects of the embodiments described herein.
Figure 7B:
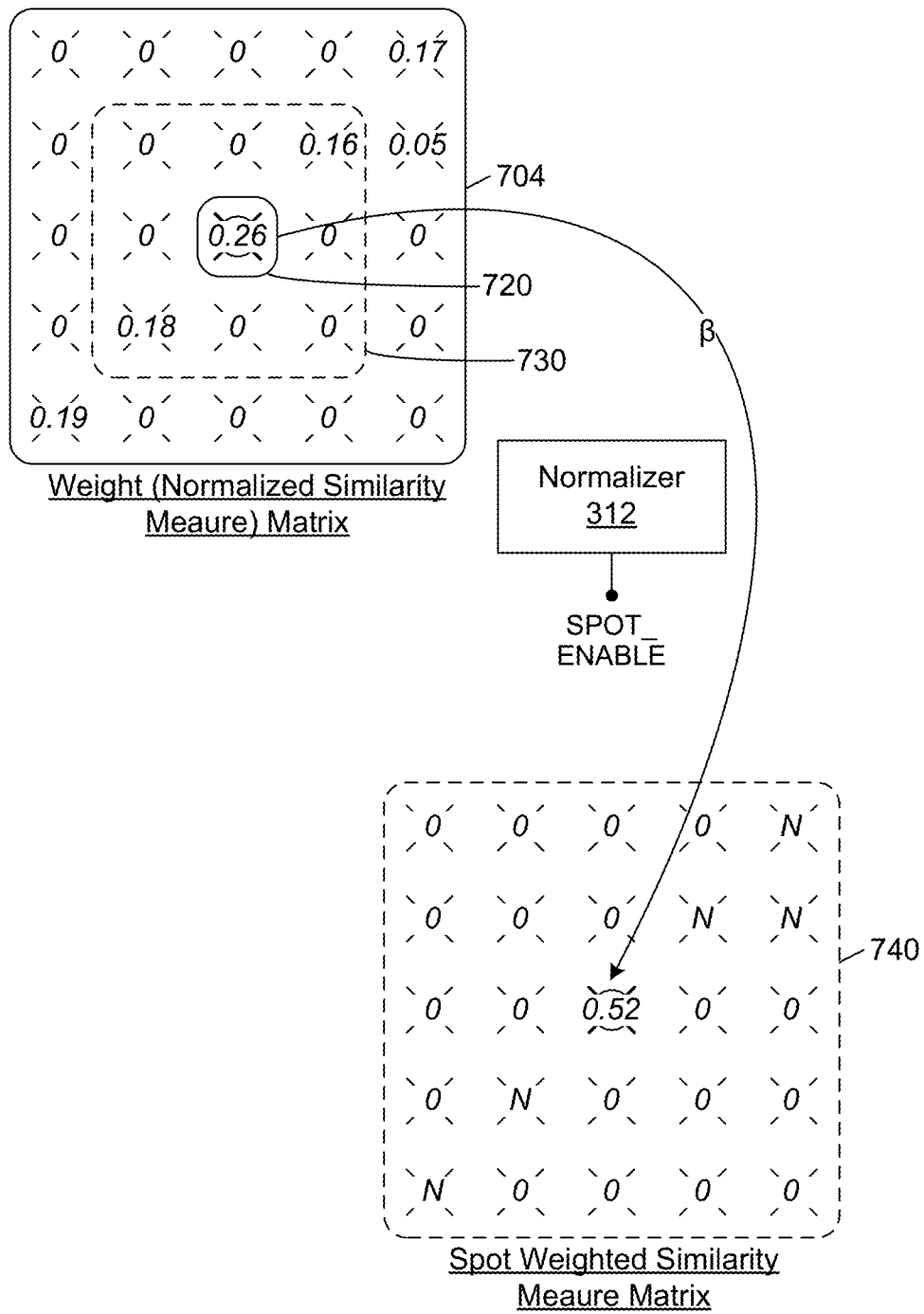
FIG. 7B illustrates an example spot weighting function performed by the normalizer in the edge smoothing block filter of FIG. 3 according to certain aspects of the embodiments described herein.

FIG. 7B illustrates an example spot weighting function performed by the normalizer 312 in the ESB filter 200 of FIG. 3 according to certain aspects of the embodiments described herein. In FIG. 7B, the weight matrix 704 is further manipulated by the normalizer 312. Particularly, according to the SPOT_ENABLE signal, the normalizer 312 multiplies one or more of the center coefficients of the weight matrix 704 by the weighting factor R. In various embodiments, the weighting factor β may range from 1.05 to 3, for example. In the example illustrated, the center weight measure within the center area 720 is weighted by a weighting factor of 2, and a spot weighted similarity matrix 740 is generated.

In one embodiment, when weighting one or more of the center coefficients according to the SPOT_ENABLE signal, the remaining coefficients N in the spot weighted similarity matrix 740 may be adjusted accordingly. For example, the remaining coefficients N may be adjusted so that the total sum of all coefficients in the matrix 740 is 1. In other embodiments, the remaining coefficients N in the matrix 740 are kept the same as the matrix 704. It is also noted that the one or more center coefficients may include those coefficients with in the center area 720 or the center area 730, in various embodiments.

In the overall context of the ESB filter 200 of FIG. 3, after the weight matrix 704 or 740 of similarity measures is generated by the normalizer 312, each weight in the weight matrix is multiplied by its corresponding or associated candidate pixel value by the multiplier 314 of FIG. 3. In turn, the current pixel updater 302 sums the results of each weight/current pixel multiplication to arrive at a resulting or filtered value of the current pixel. The candidate pixels are provided for multiplication by the weights in the weight matrix 704 or 740 by the candidate pixel selector 304. In various embodiments, one or both of the chroma and luma values of the pixels are multiplied/summed based on the weights in the weight matrix 704 or 740.

Thus, in connection with the descriptions of FIGS. 2-9, it is noted that the ESB filter 200 is designed to preserve edges better than a bilateral filter, an NLM filter, or other similar filters. According to various aspects and techniques described above, such as the selection and adaptation of various weight curves, adaptive and hybrid noise thresholds, spot weighting, coefficient symmetry, and other techniques, the ESB filter 200 described above comprises an extension of spatial-denoising filters. Below, various combinations of the ESB filter 200 with motion compensation temporal filtering elements are described.

Figure 10:
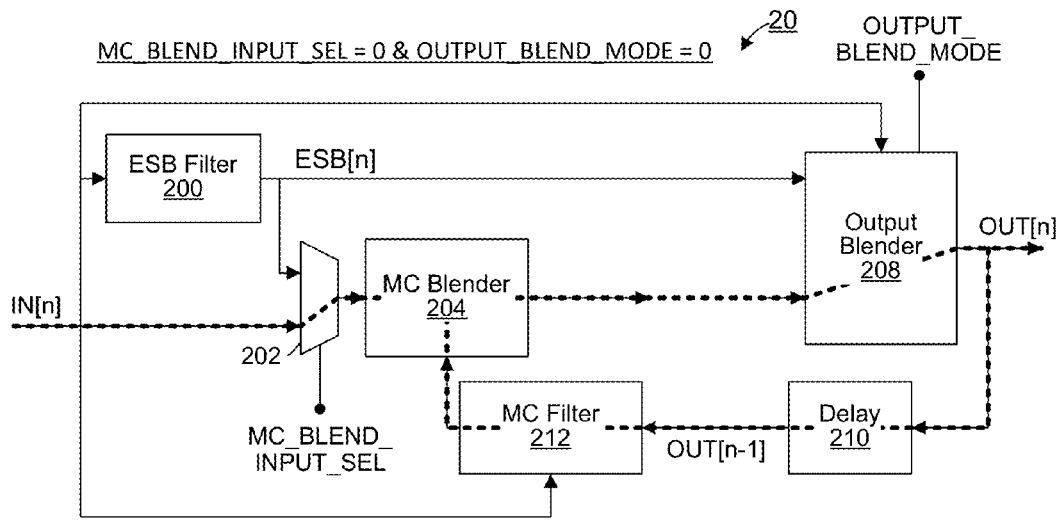
FIG. 10 illustrates an example configuration of the edge smoothing block filter and motion compensation temporal filter elements of FIG. 2 according to various embodiments described herein.
Figure 11:
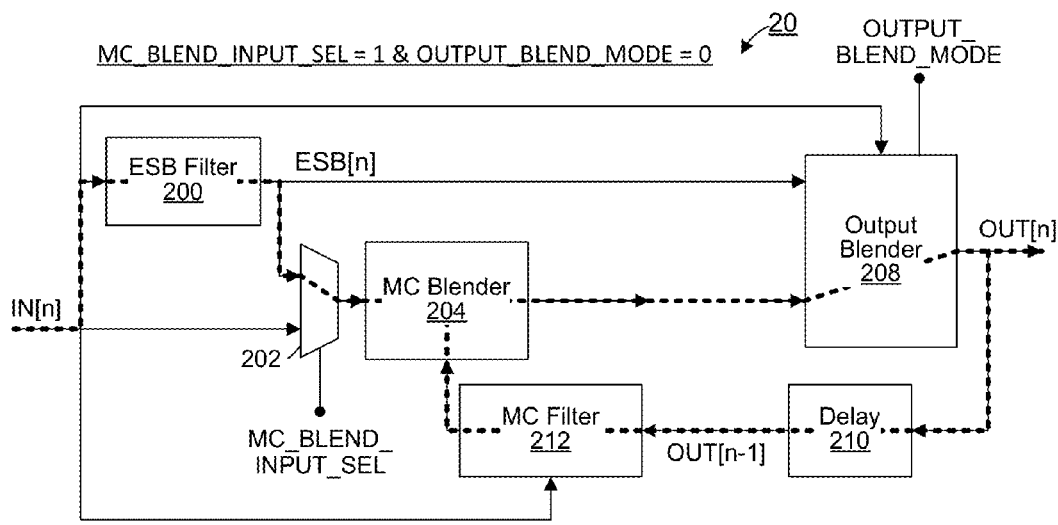
FIG. 11 illustrates another example configuration of the edge smoothing block filter and motion compensation temporal filter elements of FIG. 2 according to various embodiments described herein.
Figure 12:
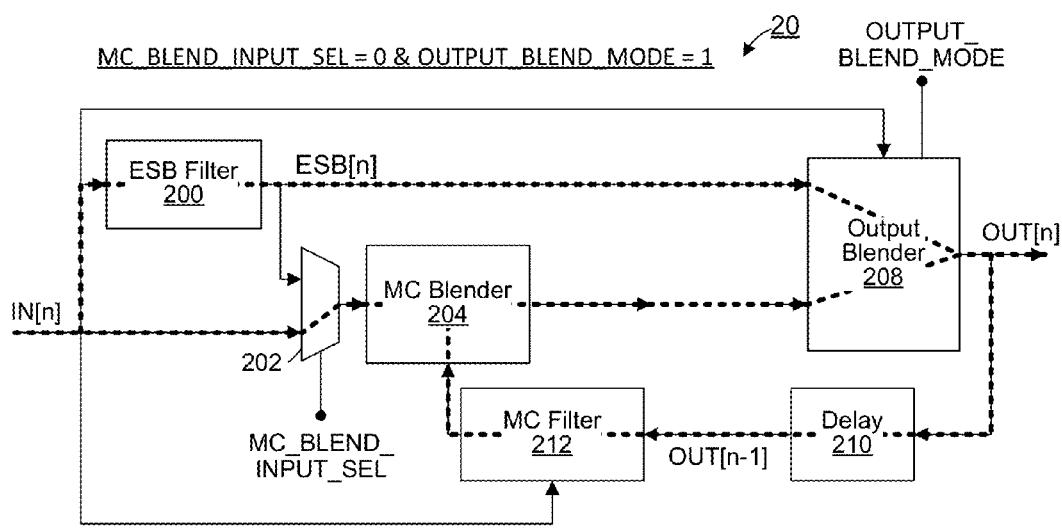
FIG. 12 illustrates another example configuration of the edge smoothing block filter and motion compensation temporal filter elements of FIG. 2 according to various embodiments described herein.

Among FIGS. 10-12, example configurations of the filter 20 of FIG. 2 are illustrated. Generally, the configurations are responsive to the MC_BLEND_INPUT_SEL input of the multiplexer 202 and the OUTPUT_BLEND_MODE input of the output blender 208. The multiplexer 202 is generally operable in two modes according to the MC_BLEND_INPUT_SEL input. When the MC_BLEND_INPUT_SEL signal is set to 0, the IN[n] signal is passed to the MC blender 204. Alternatively, when the MC_BLEND_INPUT_SEL input is set to 1, the ESB[n] signal is passed to the MC blender 204.

Further, according to various embodiments, the output blender 208 is operable in three modes according to the OUTPUT_BLEND_MODE input. When the OUTPUT_BLEND_MODE signal is set to 0, the output blender 208 outputs a blended motion compensated signal output by the MC blender 204 as the OUT[n] signal. Alternatively, when the OUTPUT_BLEND_MODE signal is set to 1, the output blender 208 outputs a blend of the blended motion compensated signal and the ESB[n] signal as the OUT[n] signal. In another mode of operation, when the OUTPUT_BLEND_MODE signal is set to 2, the output blender 208 outputs the ESB[n] signal as the OUT[n] signal.

Turning to FIG. 10, an example configuration of the ESB filter 200 among compensation temporal filter elements in the filter 20 of FIG. 2 according to various embodiments described herein is illustrated. In FIG. 10, the MC_BLEND_INPUT_SEL input of the multiplexer 202 is set to 0, and the OUTPUT_BLEND_MODE input of the output blender 208 is set to 0. Thus, as illustrated, the multiplexer 202 provides the IN[n] signal to the MC Blender 204, and the output blender 208 outputs the blended motion compensated signal output by the MC blender 204 as the OUT[n] signal.

FIG. 11 illustrates another example configuration of the ESB filter 200 among motion compensation temporal filter elements in the filter 20 of FIG. 2 according to various embodiments described herein. In FIG. 11, the MC_BLEND_INPUT_SEL input of the multiplexer 202 is set to 1, and the OUTPUT_BLEND_MODE input of the output blender 208 is set to 0. Thus, as illustrated, the multiplexer 202 provides the ESB[n] signal to the MC Blender 204, and the output blender 208 outputs the blended motion compensated signal output by the MC blender 204 as the OUT[n] signal. The configuration illustrated in FIG. 11 represents an exemplary configuration for operation of the ESB filter 200 in the filter 20. It should be appreciated that other configurations are within the scope and spirit of the embodiments described herein.

According to various settings of the ESB filter 200 and the motion compensation temporal filter elements in the filter 20 above, the ESB filter 200 may offer good noise reduction, especially for standard definition video (e.g., picture width is equal or less than 720 and picture height is equal or less than 480) and other relatively lower resolution videos. In certain cases, the filter 20 may be configured to rely upon the ESB filter 20 based on one or more video parameters, such as video resolution or progressive vs. interlaced scanning, for example.

FIG. 12 illustrates another example configuration of the ESB filter 200 among motion compensation temporal filter elements in the filter 20 of FIG. 2 according to various embodiments described herein. In FIG. 12, the MC_BLEND_INPUT_SEL input of the multiplexer 202 is set to 0, and the OUTPUT_BLEND_MODE input of the output blender 208 is set to 1. Thus, as illustrated, the multiplexer 202 provides the IN[n] signal to the MC Blender 204, and the output blender 208 outputs a blend of the blended motion compensated signal and the ESB[n] signal as the OUT[n] signal.

Figure 13:
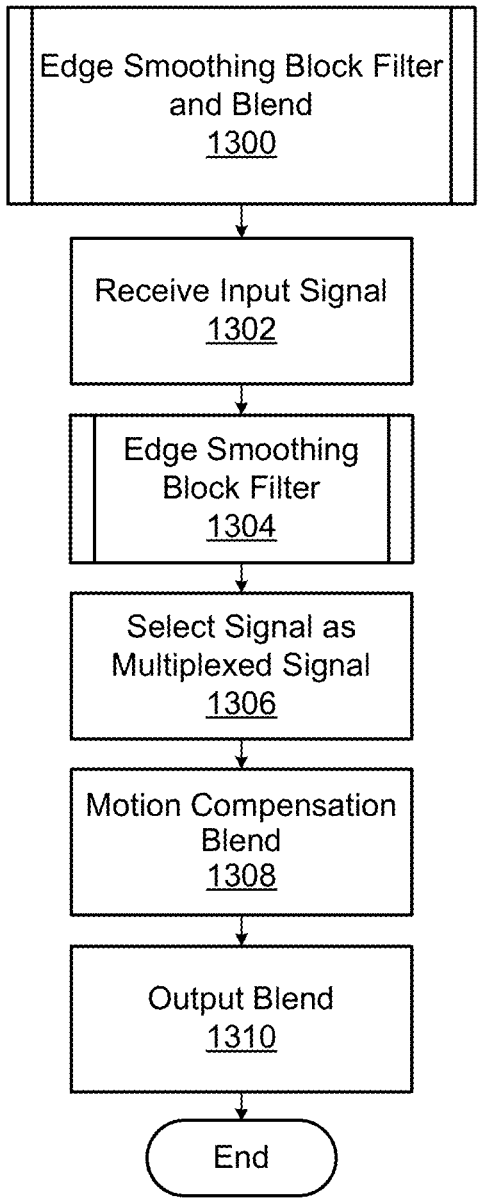
FIG. 13 illustrates an example process flow diagram of a process of edge smoothing block filtering and blending performed by the combination filter of FIG. 2 according to an example embodiment.
Figure 14:
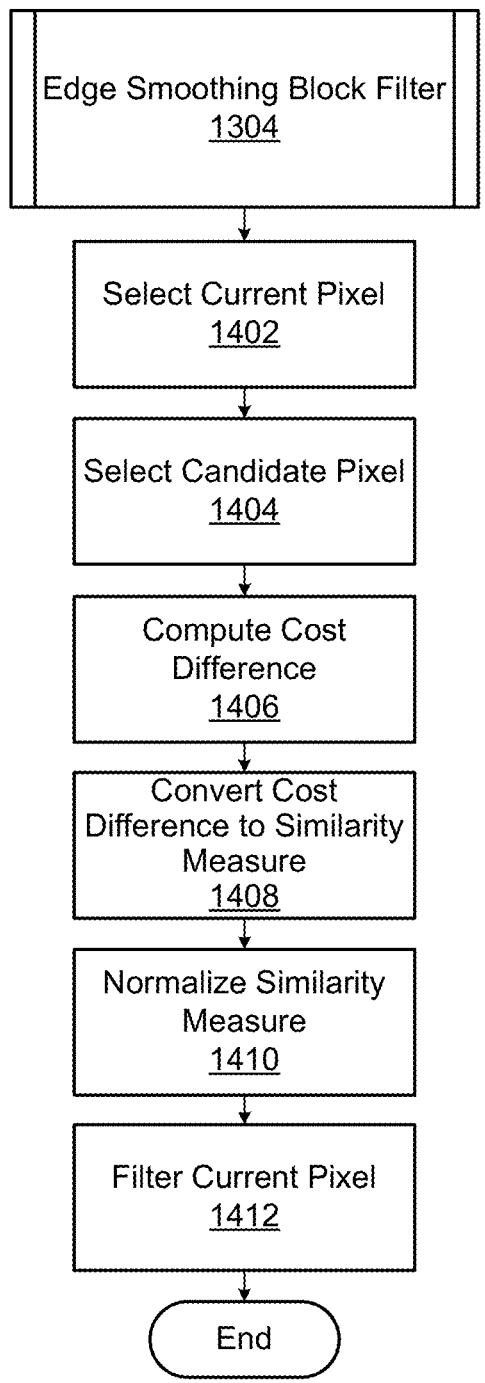
FIG. 14 illustrates an example process flow diagram of a process of edge smoothing block filtering performed by the edge smoothing block filter of FIG. 3 according to an example embodiment.

Referring next to FIGS. 13 and 14, flowcharts illustrating example processes performed by the filter 20 and the ESB filter 200 are provided. It is understood that the flowcharts of FIGS. 13 and 14 provide merely one example functional arrangement that may be employed to implement the operations of the filter 20 and the ESB filter 200, as described herein. In certain aspects, the flowcharts of FIGS. 13 and 14 may be viewed as depicting an example of steps performed by the filter 20 and the ESB filter 200 according to one or more embodiments.

FIG. 13 illustrates an example process flow diagram of a process 1300 of ESB filtering and blending performed by the combination filter 20 of FIG. 2 according to an example embodiment. Although the process 1300 is described below in connection with the filter 20 of FIG. 2, it is noted that the process 1300 may be performed by other filters similar to the filter 20.

At reference 1302, an input signal is received. For example, referring to FIG. 2, the input signal IN[n] is received by the filter 20. At reference 1304, the input signal IN[n] is filtered by an edge smoothing block filter. In FIG. 2, the input signal IN[n] is filtered by the ESB filter 200, and the ESB filter 200 generates an ESB[n] edge smoothed signal as an output. Further aspects of the process at reference 1304 are described below with reference to FIG. 14.

At reference 1306, one of the input signal and the edge smoothed signal is selected as a multiplexed output signal based on a motion blend input or control signal. For example, with reference to FIG. 2, the multiplexer 202 may select one of the input signal IN[n] and the edge smoothed signal ESB[n] as a multiplexed output signal based on the MC_BLEND_INPUT_SEL control signal, as discussed above. At reference 1308, the multiplexed output signal is blended by a motion compensation blender, to generate a blended motion compensated signal. For example, the multiplexed output signal may be blended with the output of an MCTF filter. That is, in FIG. 2, the MC blender 204 blends the multiplexed output signal from the multiplexer 202 with a motion compensated signal output from the MC filter 212, to generate a blended motion compensated signal.

At reference 1310, the input signal, the blended motion compensated signal, and the edge smoothed input signal are blended into an output blend signal based on an output blend mode signal. In one embodiment, output blending at reference 1310 comprises outputting at least one of the blended motion compensated signal, the edge smoothed signal, or a blend of the blended motion compensated signal and the edge smoothed signal based on an output blend input signal. With reference to FIG. 2, the output blender 208 output blends the IN[n] input signal, the blended motion compensated signal, and the ESB[n] edge smoothed signal based on the OUTPUT_BLEND_MODE signal as discussed above.

Thus, according to the process 1300 of ESB filtering and blending described above, either an input signal or the edge smoothed signal is selected as a multiplexed output signal based on the motion blend input or control signal. This multiplexed output signal is provided for motion compensation blending with a motion compensated signal. The motion compensated signal may comprise the output of an MCTF filter, for example. Further, the output blend signal is generated as at least one of the blended motion compensated signal, the edge smoothed signal, or a blend of the blended motion compensated signal and the edge smoothed signal based on the output blend input signal. According at least to the motion blend input or control signal and the output blend input signal, the process 1300 is capable of generating various blends of ESB and MCTF filtered image data.

FIG. 14 illustrates an example process flow diagram of the process 1304 of edge smoothing block filtering performed by the ESB filter 200 of FIG. 3 according to an example embodiment. Although the process 1304 is described below in connection with the ESB filter 200 of FIG. 3, it is noted that the process 1304 may be performed by other filters similar to the ESB filter 200.

At reference 1402, the current pixel selector 302 selects a current pixel as a pixel to be filtered. The current pixel may be a pixel in a video frame of the input signal IN[n], for example. At reference 1404, the candidate pixel selector 304 selects a candidate pixel within a search area about the current pixel. With reference back to FIG. 4 for an example, the current pixel selector 302 may select any of the pixels within the image, such as the pixel 410, as a current pixel to be filtered. Further, the candidate pixel selector 304 may select a candidate pixel within a search area 430, such as any one of the candidate pixels 420*a*-420*n*, as the candidate pixel.

At reference 1406, the neighborhood SAD calculator 306 computes a cost difference between pixels within a candidate pixel neighborhood about the candidate pixel and pixels within a current pixel neighborhood about the current pixel. Referring again to FIG. 4, reference 422*a* illustrates an example candidate pixel neighborhood about the candidate pixel 420*a*, and reference 412 illustrates an example a current pixel neighborhood about the current pixel 410. With further reference to FIG. 5, at reference 1406 of FIG. 14, the neighborhood SAD calculator 306 may sum the absolute difference between the a1 and b1 pixel luma values, the absolute difference between the a2 and b2 pixel luma values, the absolute difference between the a3 and b3 pixel luma values, and so forth, for each pixel within the neighborhoods 412 and 422*a*. In other embodiments, the neighborhood SAD calculator 306 may calculate cost differences using metrics other than the SAD metric at reference 1406. Additionally or alternatively to using pixel luma values, pixel chroma values may be relied upon in cost difference calculations by the neighborhood SAD calculator 306 at reference 1406.

It is noted that, in certain embodiments, reference 1406 includes computing a cost difference between pixels within a candidate pixel neighborhood about a candidate pixel and pixels within a current pixel neighborhood about a current pixel for each of a plurality of candidate pixels within a search area about the current pixel. That is, in certain embodiments, the neighborhood SAD calculator 306 computes a cost difference between the pixels within the candidate pixel neighborhood of each of the candidate pixels 420*a*-420*n* within the search area 430, and the corresponding pixels within the current pixel neighborhood 412 of the current pixel 410. It is also noted that, in certain embodiments, reference 1406 includes computing a symmetric cost difference matrix, as described above in connection with FIG. 6.

At reference 1408 of FIG. 14, the weighter 308 converts the cost difference(s) calculated at reference 1406 to a similarity measure(s) based on a weight function, the weight function being selected according to a measure of filter strength. For example, the measure of filter strength may be selected or determined according to a shape of a weight curve relied upon by the weighter 308, as described above in connection with FIG. 7. Additionally, the cost difference(s) may be calculated at reference 1406 based on a noise threshold of the weight function or weight curve. According to the aspects of the embodiments described above, the noise threshold may be selected according to noise register values (e.g., NOISE_SIGMA) maintained by the ESB filter 200 and the SMOOTHING_STRENGTH and SMOOTHING_ENABLE control signals of the threshold selector 310 of FIG. 3. It is noted that converting cost differences at reference 1408 may include converting a matrix of cost differences to a matrix of similarity measures, as described above in connection with the cost matrix 502 and the similarity measure matrix 702 of FIG. 7A.

At reference 1410 of FIG. 14, the normalizer 312 normalizes the similarity measure(s) generated at reference 1408. This normalization by the normalizer 312 may include converting a matrix of similarity measures to a matrix of weight normalized similarity measures, as described above in connection with the cost similarity measure matrix 702 and the weight normalized similarity measure matrix 704 of FIG. 7A. Additionally, in certain embodiments, the normalizer 312 may apply a spot weight to one or more center weights, based on the SPOT_ENABLE signal, as described above in connection with FIG. 7B.

At reference 1412 of FIG. 14, the ESB filter 200 filters the current pixel based on the value of the candidate pixel(s) weighted by the normalized similarly measure(s). For example, after the weight matrix 704 of FIG. 7A of similarity measures is generated by the normalizer 312 at reference 1410, each weight in the weight matrix is multiplied by its corresponding or associated candidate pixel value by the multiplier 314 of FIG. 3. In turn, the current pixel updater 302 sums the results of each weight/current pixel multiplication to arrive at a resulting or filtered value of the current pixel at reference 1412.

Figure 15:
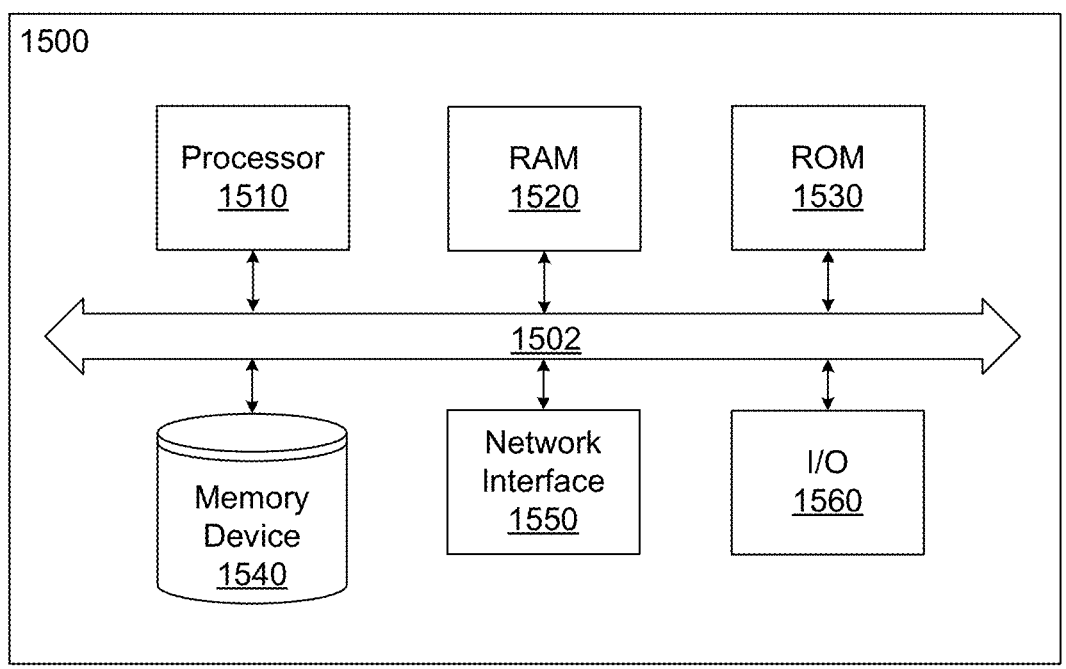
FIG. 15 illustrates an example schematic block diagram of a computing environment that may be employed in the by the combination structure of FIG. 2 or the edge smoothing block filter of FIG. 3 according to various embodiments described herein.

FIG. 15 illustrates an example schematic block diagram of a computing device 1500 that may be employed in the by the combination structure of FIG. 2 or the ESB filter 200 of FIG. 3 according to various embodiments described herein.

The computing device 1500 may be embodied, in part, using one or more elements of a general purpose computer. The computing device 1500 includes a processor 1510, a Random Access Memory ("RAM") 1520, a Read Only Memory ("ROM") 1530, a memory device 1540, a network interface 1550, and an Input Output ("I/O") interface 1560. The elements of computing device 1500 are communicatively coupled via a bus 1502. The elements of the computing device 1500 are not intended to be limiting in nature, as the device may further include a display, a display interface, and speakers, among other elements.

In various embodiments, the processor 1510 may comprise any well-known general purpose arithmetic processor, state machine, or Application Specific Integrated Circuit ("ASIC"), for example. The RAM and ROM 1520 and 1530 may comprise any well-known random access or read only memory device that stores computer-readable instructions to be executed by the processor 1510. The memory device 1540 stores computer-readable instructions thereon that, when executed by the processor 1510, direct the processor 1510 to execute various aspects of the embodiments described herein.

In certain embodiments, the processor 1510 may comprise a state machine or ASIC, and the elements of FIGS. 2 and 3 and processes described in FIGS. 13 and 14 may be implemented or executed by the state machine or ASIC according to a specialized or embedded circuitry design, by firmware, or a combination of a circuitry and firmware.

As a non-limiting example group, the memory device 1540 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1550 comprises hardware interfaces to communicate over data networks. The I/O interface 1560 comprises device input and output interfaces such as keyboard, pointing device, display, communication, and other interfaces. The bus 1502 electrically and communicatively couples the processor 1510, the RAM 1520, the ROM 1530, the memory device 1540, the network interface 1550, and the I/O interface 1560, so that data and instructions may be communicated among them.

In certain aspects, the processor 1510 is configured to retrieve computer-readable instructions and data stored on the memory device 1540, the RAM 1520, the ROM 1530, or other storage means, and copy the computer-readable instructions to the RAM 1520 or the ROM 1530 for execution, for example. The processor 1510 is further configured to execute the computer-readable instructions to implement various aspects and features of the embodiments described herein. For example, the processor 1510 may be adapted and configured to execute the processes described above with reference to FIGS. 13 and 14. In embodiments where the processor 1510 comprises a state machine or ASIC, the processor 1510 may include internal memory and registers for maintenance of data, such as pixel values, being processed.

The flowcharts or process diagrams of FIGS. 13 and 14 are representative of certain processes, functionality, and operations of embodiments discussed herein. Each block may represent one or a combination of steps or executions in a process. Alternatively or additionally, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processor 1510. The machine code may be converted from the source code, etc. Further, each block may represent, or be connected with, a circuit or a number of interconnected circuits to implement a certain logical function or process step.

Although the flowcharts or process diagrams of FIGS. 13 and 14 illustrate an order, it is understood that the order may differ from that which is depicted. For example, an order of execution of two or more blocks may be scrambled relative to the order shown. Also, two or more blocks shown in succession in FIGS. 13 and 14 may be executed concurrently or with partial concurrence. Further, in some embodiments, one or more of the blocks shown in FIGS. 13 and 14 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Further aspects of the embodiments described herein are described in the accompanying attached APPENDIX A.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method of edge smoothing block filtering, comprising:

selecting a current pixel as a pixel to be filtered;

selecting a candidate pixel within a search area about the current pixel;

computing a cost difference between pixels within a candidate pixel neighborhood about the candidate pixel and pixels within a current pixel neighborhood about the current pixel, wherein computing a cost difference comprises summing difference between each pixel within the candidate pixel neighborhood and a corresponding pixel within the current pixel neighborhood;

converting the cost difference to a similarity measure based on a weight function and a smoothing noise threshold, the smoothing noise threshold associated with at least one of a local contrast strength or noise register values, the smoothing noise threshold determined by a function of a fixed threshold value and a value determined using a plurality of cost differences, wherein the similarity measure indicates a measure of filter strength; and filtering the current pixel based on the candidate pixel and the similarity measure, wherein filtering the current pixel comprises modifying the candidate pixel by a function of the similarity measure.

2. The method of claim 1, wherein:

converting the cost difference to a similarity measure further comprises converting the cost difference to the similarity measure based on a weight function, the weight function being selected according to a measure of filter strength; and the method further comprises setting a value of the smoothing noise threshold according to a function of the cost difference.

3. The method of claim 2, wherein filtering the current pixel comprises filtering the current pixel based on a value of the candidate pixel weighted by the similarly measure.

4. The method of claim 1, wherein computing a cost difference comprises, for each of a plurality of candidate pixels within the search area about the current pixel, computing a cost difference between pixels within a candidate pixel neighborhood about the candidate pixel and the pixels within the current pixel neighborhood about the current pixel.

5. The method of claim 4, further comprising:

setting a value of the smoothing noise threshold based on a function of the cost differences of the plurality of candidate pixels, wherein converting the cost difference to a similarity measure further comprises converting each of the cost differences to a similarity measure based on the smoothing noise threshold.

6. The method of claim 5, wherein setting a value of the smoothing noise threshold further comprises setting the value of the smoothing noise threshold according to one of the fixed threshold value or a fraction of a maximum value of the cost differences.

7. The method of claim 6, further comprising:

when the fraction of the maximum value of the cost differences is less than the fixed threshold value, setting the value of the smoothing noise threshold to the fixed threshold value; and when the fraction of the maximum value of the cost differences is greater than or equal to the fixed threshold value, setting the value of the smoothing noise threshold to the fraction of the maximum value of the cost differences.

8. The method of claim 7, further comprising setting the fraction of the fraction of the maximum value of the cost differences according to a desired amount of smoothing.

9. The method of claim 8, further comprising normalizing each of the similarity measures.

10. The method of claim 9, wherein filtering the current pixel comprises filtering the current pixel based on the value of each of the plurality of candidate pixels weighted by the normalized similarly measures.

11. An edge smoothing block filter, comprising:

a current pixel selector that selects a current pixel as a pixel to be filtered;

a candidate pixel selector that selects a candidate pixel within a search area about the current pixel;

a neighborhood calculator that computes a cost difference between pixels within a candidate pixel neighborhood about the candidate pixel and pixels within a current pixel neighborhood about the current pixel by summing difference between each pixel within the candidate pixel neighborhood and a corresponding pixel within the current pixel neighborhood;

a weighter that converts the cost difference to a similarity measure based on a weight function and a smoothing noise threshold, the weight function being selected according to a measure of filter strength and the smoothing noise threshold associated with at least one of a local contrast strength or noise register values, the smoothing noise threshold determined by a function of a fixed threshold value and a value determined using a plurality of cost differences; and a current pixel updater that filters the current pixel based on a value of the candidate pixel weighted by the similarly measure.

12. The edge smoothing block filter of claim 11, wherein the neighborhood calculator further computes, for each of a plurality of candidate pixels within the search area about the current pixel, a cost difference between pixels within a candidate pixel neighborhood about the candidate pixel and the pixels within the current pixel neighborhood about the current pixel.

13. The edge smoothing block filter of claim 12, wherein the weighter sets a value of the smoothing noise threshold based on a function of the cost differences of the plurality of candidate pixels.

14. The edge smoothing block filter of claim 13, wherein the weighter sets the value of the smoothing noise threshold according to one of the fixed threshold value or a fraction of a maximum value of the cost differences.

15. The edge smoothing block filter of claim 14, wherein the weighter is configured to:
- when the fraction of the maximum value of the cost differences is less than the fixed threshold value, set the value of the smoothing noise threshold to the fixed threshold value; and
- when the fraction of the maximum value of the cost differences is greater than or equal to the fixed threshold value, set the value of the smoothing noise threshold to the fraction of the maximum value of the cost differences.

* * * * *